Aug. 22, 1944.   M. K. ZINN   2,356,296
PROTECTIVE SYSTEM
Filed Sept. 9, 1942
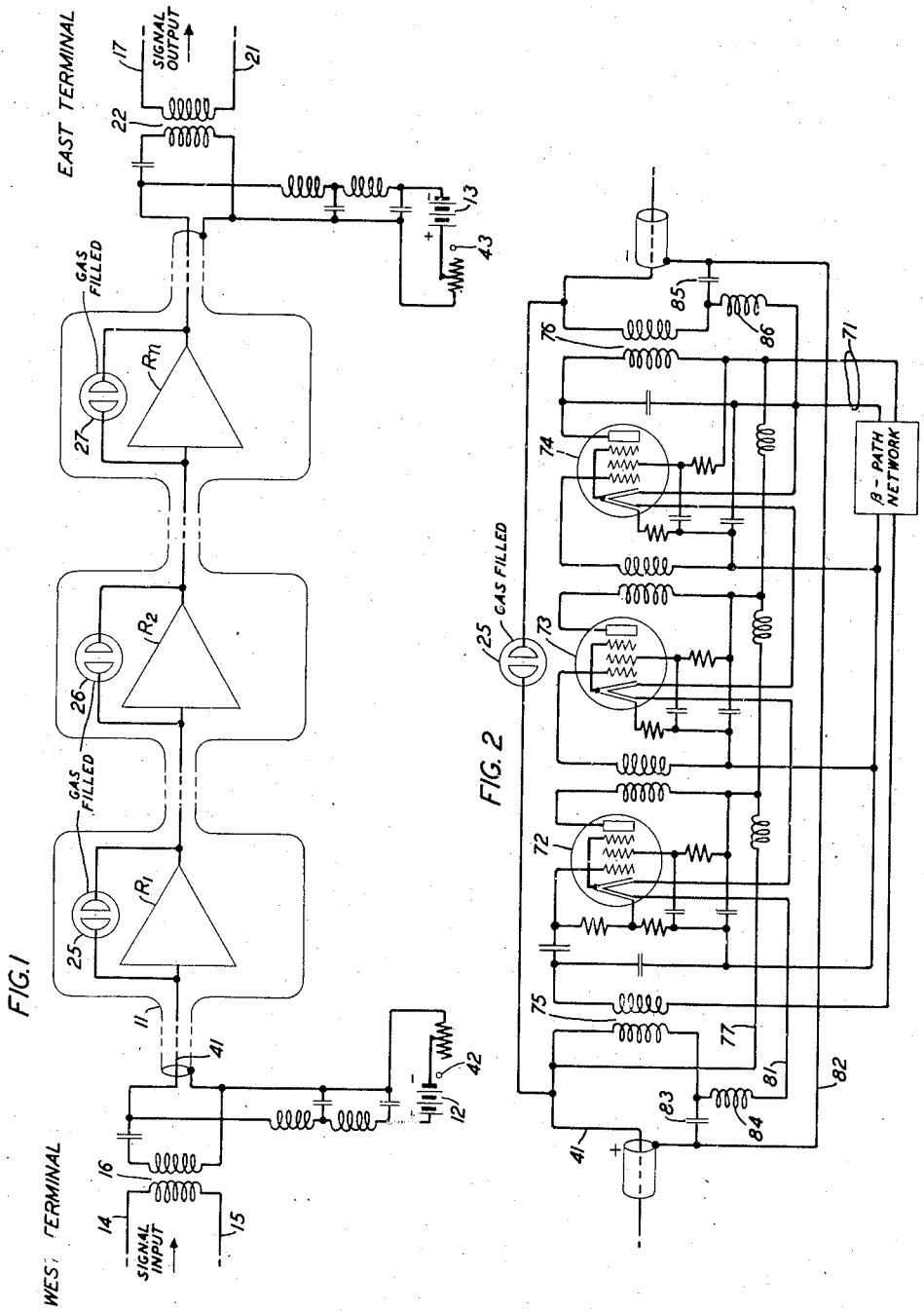
INVENTOR
M. K. ZINN
BY H. A. Burgers
ATTORNEY Patented Aug. 22, 1944

2,356,296

UNITED STATES PATENT OFFICE 2,356,296

PROTECTIVE SYSTEM

Manvel K. Zinn, Manhasset, N. Y., assignor to Bell Telephone Laboratories, Incorporated, New York, N. Y., a corporation of New York Application September 9, 1942, Serial No. 457,737

1 Claim. (Cl. 179—171)

This invention relates to protective systems and more particularly to an arrangement for protecting the repeater elements of a transmission system from damage due to excessive and destructive voltages and currents.

While by no means limited thereto, the arrangement of the present invention is particularly applicable in connection with a submarine cable system of the general type disclosed in O. E. Buckley et al. Patent 2,020,297 of November 12, 1935, and is disclosed herein as applied to such a system.

An object of the invention is to simplify protective apparatus used in a transmission system while, at the same time, assuring the reliability and efficiency of such apparatus.

A further object of the invention is to maintain signaling continuity over a transmission system at such times as excessive voltages or currents exist in certain portions of the system and while such excessive voltages or currents are being diverted from those portions of the system which are susceptible to damage therefrom.

As disclosed in the Buckley et al. patent referred to above, as well as in my copending application Serial No. 417,331, filed October 31, 1941, entitled "Electric wave system," the necessary power for the vacuum tube elements of the spaced repeaters of a long transmission system such as a submarine cable system may be supplied over the cable from suitable sources, such as batteries, provided at the terminals. It is recognized that surges will occur in the system whenever any abrupt change is made in the circuit conditions of the high voltage channel over which power is supplied from the terminal sources to the repeaters. So far as changes occurring when the power is intentionally turned on and off are concerned, these may be guarded against by provision of suitable apparatus at the terminals which will assure a gradual building up or decreasing of the voltage. However, in the event of a fault occurring in the cable or in one of the repeaters, such for example, as breakdown of a filter condenser of an amplifier, transient voltages and currents may be set up that will exceed the normal steady operating values by many times. Such transients cannot well be guarded against by terminal apparatus and the invention provides means for protecting against such effects at each of the repeaters. In order to afford adequate protection against surges the amplifier element of each repeater must be protected against excessive currents and voltages which may arise from a short-circuit occurring in the adjacent cable structure or in a preceding repeater as well as against excessive voltages arising from an open circuit. As either the short-circuit condition or the open-circuit condition will result in excessive voltages, it is feasible to have the protective device operate on the basis of excessive voltage.

In accordance with a specific embodiment of the present invention as applied to the separated, unattended repeaters of a submarine cable system of the general type disclosed in the Buckley et al. patent referred to above, a path including a normally non-conductive gaseous discharge device is associated with each repeater, being connected to the central conductor of the cable between the point at which the conductor is connected to the input of each amplifier and the point at which the conductor is connected to the output of the same amplifier. The path therefore is in shunt to the respective amplifier and in series with the line. The breakdown voltage of the discharge device is so fixed that it remains non-conductive under normal operating voltages of the system and the path, therefore, has no effect on the normal operation of the transmission system. Upon occurrence of a voltage of excessive value, however, the discharge device will break down and become conductive and any excessive voltage currents will be shunted around the amplifier thereby preventing damage to the vacuum tube elements. Further, in the event of an "open" occurring in the energizing path of an amplifier as a result of the fault, the resulting transients will cause the gaseous discharge device to break down and render the shunt path around the respective amplifier conductive. This path around the amplifier serves to maintain continuity of the transmission system, a feature particularly desirable as it permits the transmission of testing currents from the attended station in order to locate the distant defective repeater.

A complete understanding of the operation of the arrangement contemplated by the present invention as well as appreciation of the various desirable features thereof may be gained from consideration of the following detailed description and the annexed drawing in which:

Fig. 1 illustrates in simplified diagrammatic form and in general outline a one-way telephone cable provided with unattended repeaters at spaced intervals and including means in accordance with the present invention for protection of the repeaters against excessive current and voltage; and Fig. 2 shows in detail the circuit configuration of one of the unattended repeaters of the system of Fig. 1.

Referring now to Fig. 1 there is represented submarine cable 11 connecting two land points designated respectively "West terminal" and "East terminal"; the cable may be of the general type disclosed in Buckley et al. Patent 2,020,297 in that a number of repeater elements of the vacuum tube type, designated $R_1$, $R_2$ and $R_n$, are enclosed at spaced intervals within the protective sheath of the cable. The necessary power for the vacuum tube elements may be supplied over the cable from suitable sources provided at the land terminals such, for example, as batteries 12 and 13.

The intelligence conveying waves to be transmitted over the cable, which may be for example speech or carrier waves, are applied to line wires 14 and 15 by suitable transmitting equipment at the west terminal and are impressed on cable 11 by transformer 16. These waves while passing over cable 11 are amplified by the respective vacuum tubes of repeaters $R_1$, $R_2$ ... $R_n$, and, upon reaching the east terminal, are impressed on line wires 17 and 21 by transformer 22. Suitable intelligence receiving equipment is associated with lines 17 and 21 at the east terminal.

As shown, a gaseous discharge device is connected in shunt with each repeater, discharge device 25 being connected in shunt to repeater $R_1$, discharge device 26 in shunt to repeater $R_2$ and discharge device 27 in shunt to repeater $R_n$. Connection of these shunt paths to line 41 has no appreciable effect on the normal operation of the system as the breakdown voltage of the respective gaseous discharge devices is so fixed that they remain non-conductive under normal operating voltages of the system. The discharge devices will take no power during normal operation and as the "shelf-life" of this type of discharge device is indefinitely long, there should be no question of serious deterioration of the gaseous discharge device during the life of the cable installation.

Let us assume now that some fault occurs in the system; for example, let us assume that one of the filter condensers of the amplifier element of repeater $R_1$ breaks down. The resulting transient voltages may reach a value many times in excess of the normal operating voltages and will, at any rate, be sufficient to "break down" discharge device 25 and render it conductive. The heavy transient currents will then pass over the shunt path established by breakdown of discharge device 25 whereby damage to the various elements of repeater $R_1$ will be prevented.

The discharge device operates as described upon occurrence of any other fault or condition in the system which gives rise to voltages of a value substantially higher than the normal operating voltages of the system. Protection against faults of various types is thereby provided by the means contemplated by the invention.

The shunt path through gaseous discharge device 25 in addition to diverting damaging currents and voltages from repeater $R_1$, serves also to maintain signaling continuity over line 41 even though repeater $R_1$ be defective. This is a particularly desirable feature as it permits transmission of testing signals along line 41 for the purpose of locating the defective repeater or repeaters. Further, the shunt path might, in certain cases, make possible the continued transmission of speech or carrier waves over the system even though repeater $R_1$ were open.

The gaseous discharge devices, after having broken down, may be restored to normal, non-conducting condition in various ways, for example, by reducing the voltage sufficiently or by momentarily removing the voltage entirely. The voltage may be reduced, of course, by adjustment of the variable resistances associated with batteries 12 and 13 and entirely cut off by movement of the variable arm to contact 42 or contact 43, respectively.

It will be understood that gaseous discharge devices 26 and 27, associated with repeaters $R_2$ and $R_n$, respectively, operate in a manner similar to that described above in connection with discharge device 25.

Referring now to Fig. 2 there is shown in detail the amplifier circuit of repeater $R_1$; the amplifier circuits of all the repeaters are similar and only that of repeater $R_1$ will be described in detail. The amplifier circuit illustrated may be of the type which utilizes a stabilizing negative feedback connection or path 71 of the general type disclosed in H. S. Black Patent 2,102,671, issued December 21, 1937, and includes, in this instance, three vacuum tubes 72, 73 and 74 connected in tandem. Each of these vacuum tubes is provided with an indirectly heated cathode, a heater, an input grid, a screen grid, a suppressor grid and an anode. The different stages of the amplifier are interconnected by transformers in the usual manner and the input and output paths are connected to the amplifier by input transformer 75 and output transformer 76, respectively.

The necessary anode and screen potential is supplied over line 77 while the energizing current for the heaters is supplied over line 81 and return line 82. Low-pass filters, comprising respectively capacitance 83 and inductance 84 and capacitance 85 and inductance 86, serve to segregate the direct current supply branch and the high frequency signaling branch.

Now should a fault occur in the system—for example, if capacitance 83 should break down—the resulting transient voltages will cause gaseous discharge device 25 to break down, thereby establishing a shunt path around repeater $R_1$ from a point on line 41 where it enters the repeater to a point on the same line where it leaves the repeater. This shunt path not only diverts dangerously high voltages from the vacuum tubes and other elements of the repeater but, also, as pointed out above, provides means for maintaining signaling continuity over line 41 even though the repeater circuit itself be open.

While certain specific embodiments of the invention have been selected for disclosure and detailed description the invention is not, of course, limited in its application to such embodiments. The embodiments disclosed should be taken as illustrative of the invention and not as restrictive thereof.

What is claimed is:

In a signaling system comprising an attended station and a plurality of unattended repeater stations geographically separated from said attended station and from each other and having a transmission line joining said attended station and said unattended stations, an amplifier at each of said unattended stations connected in series with said line, a potential source for said amplifiers connected to said line at the attended station and means, including a normally non-conductive path and a gaseous discharge tube connected in said path as a series element, associated with each of said amplifiers for establishing a supplementary signaling path around a respective amplifier upon occurrence of a break in the energizing path of said respective amplifier with consequent disabling of said respective amplifier, said gaseous discharge tubes respectively becoming conductive to establish a shunt path around a respective amplifier, while such amplifier is in operative condition, upon occurrence of a voltage of excessive value, for diverting the excessive voltage from said amplifier, each of said gaseous discharge tubes remaining non-conductive upon the voltages normally applied to the signaling system but becoming conductive to render the associated path conductive upon occurrence of abnormal voltage of magnitude sufficient to damage elements of an amplifier if applied thereto.

MANVEL K. ZINN.